(No Model.)
5 Sheets—Sheet 1.
A. PRESTAT.
MACHINE FOR MAKING SHOE NAILS.
No. 326,240.  Patented Sept. 15, 1885.
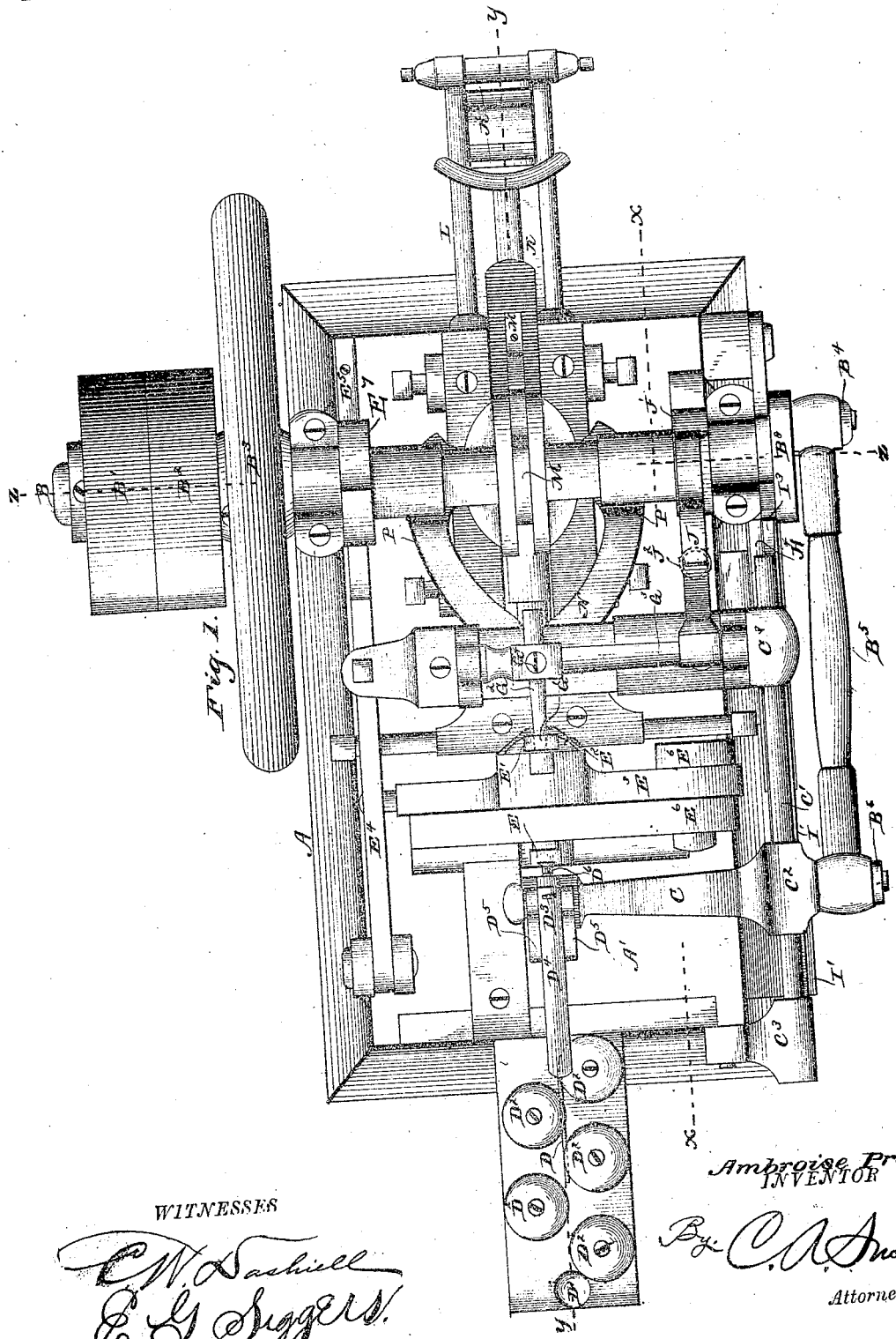
WITNESSES
Ambroise Prestat
INVENTOR
Attorney (No Model.) 5 Sheets—Sheet 2.
A. PRESTAT.
MACHINE FOR MAKING SHOE NAILS.
No. 326,240. Patented Sept. 15, 1885.
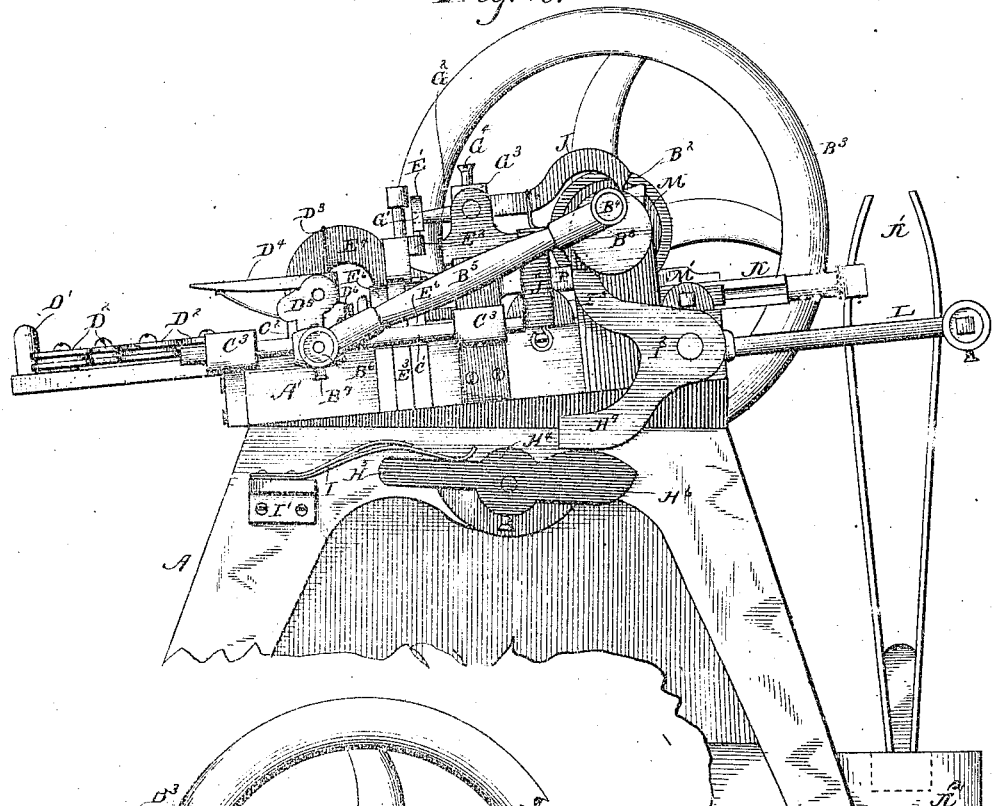
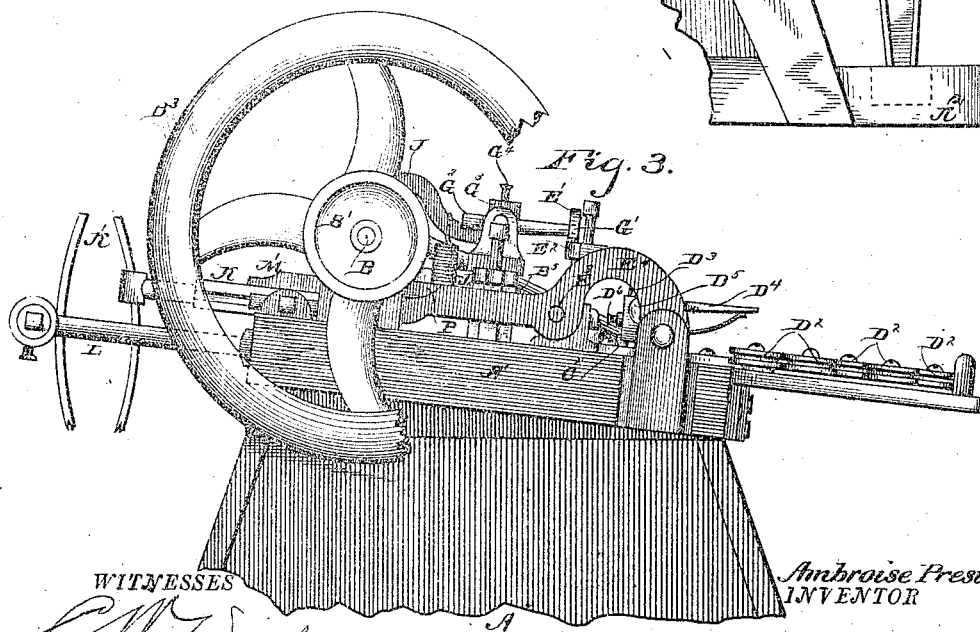
WITNESSES
Ambroise Prestat
INVENTOR
Attorney (No Model.)  A. PRESTAT.  5 Sheets—Sheet 3.
MACHINE FOR MAKING SHOE NAILS.
No. 326,240.  Patented Sept. 15, 1885.
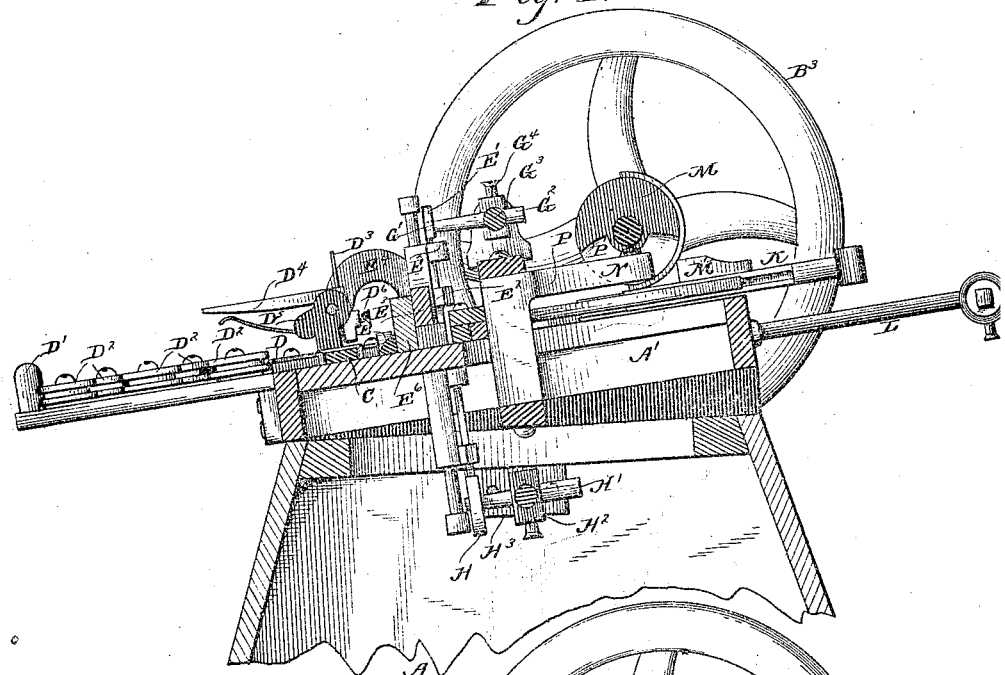
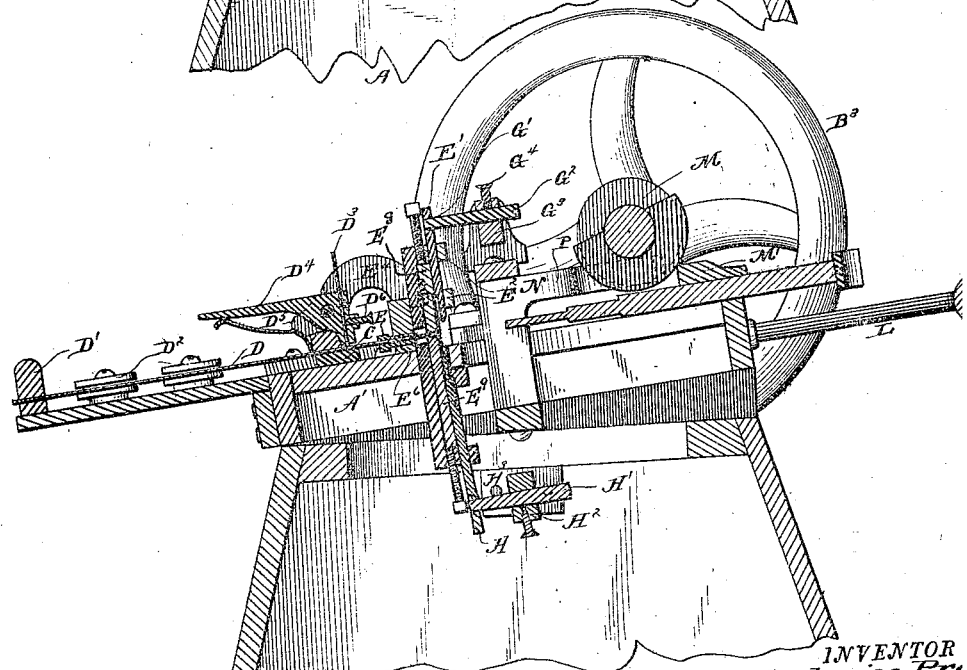

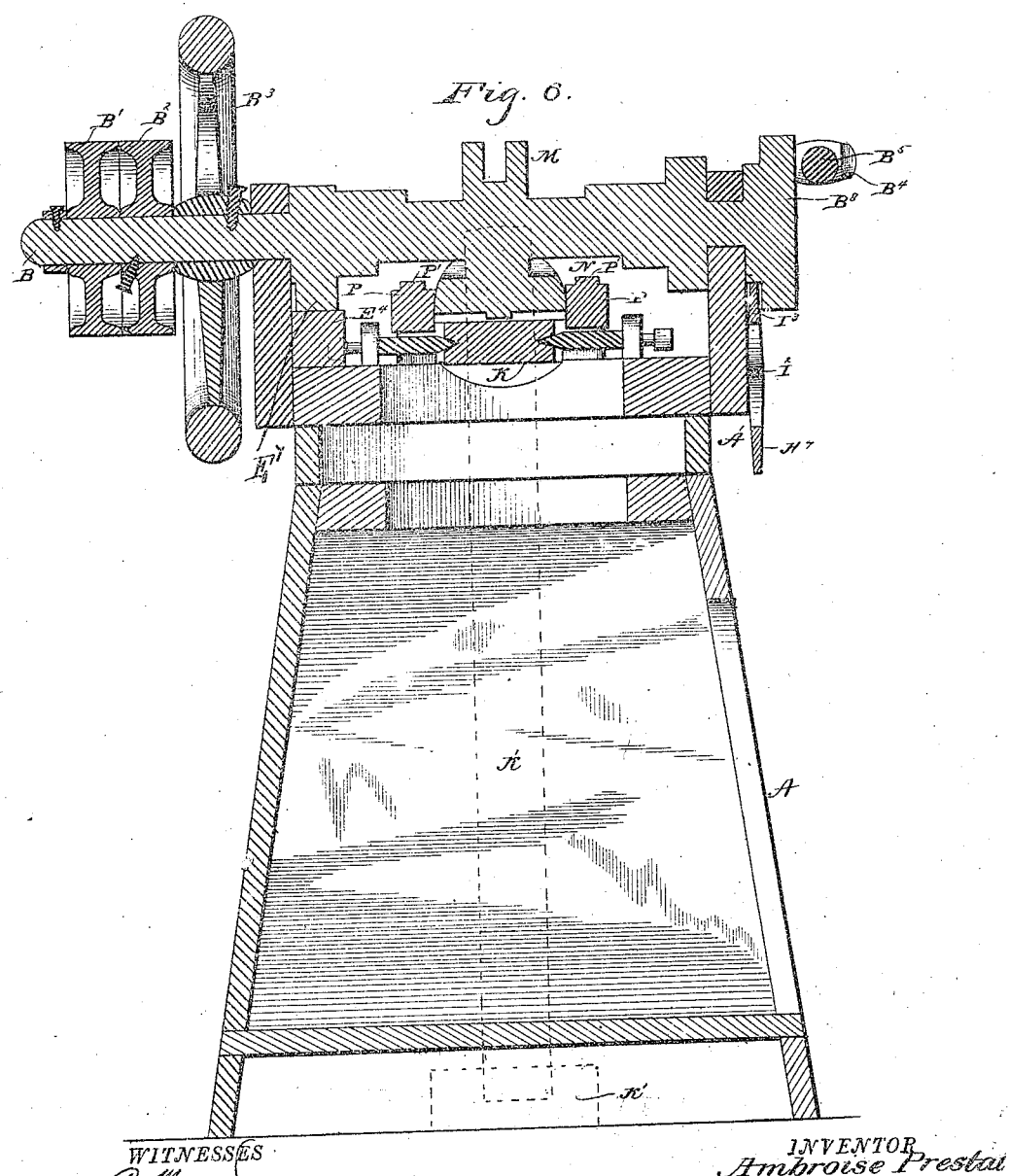

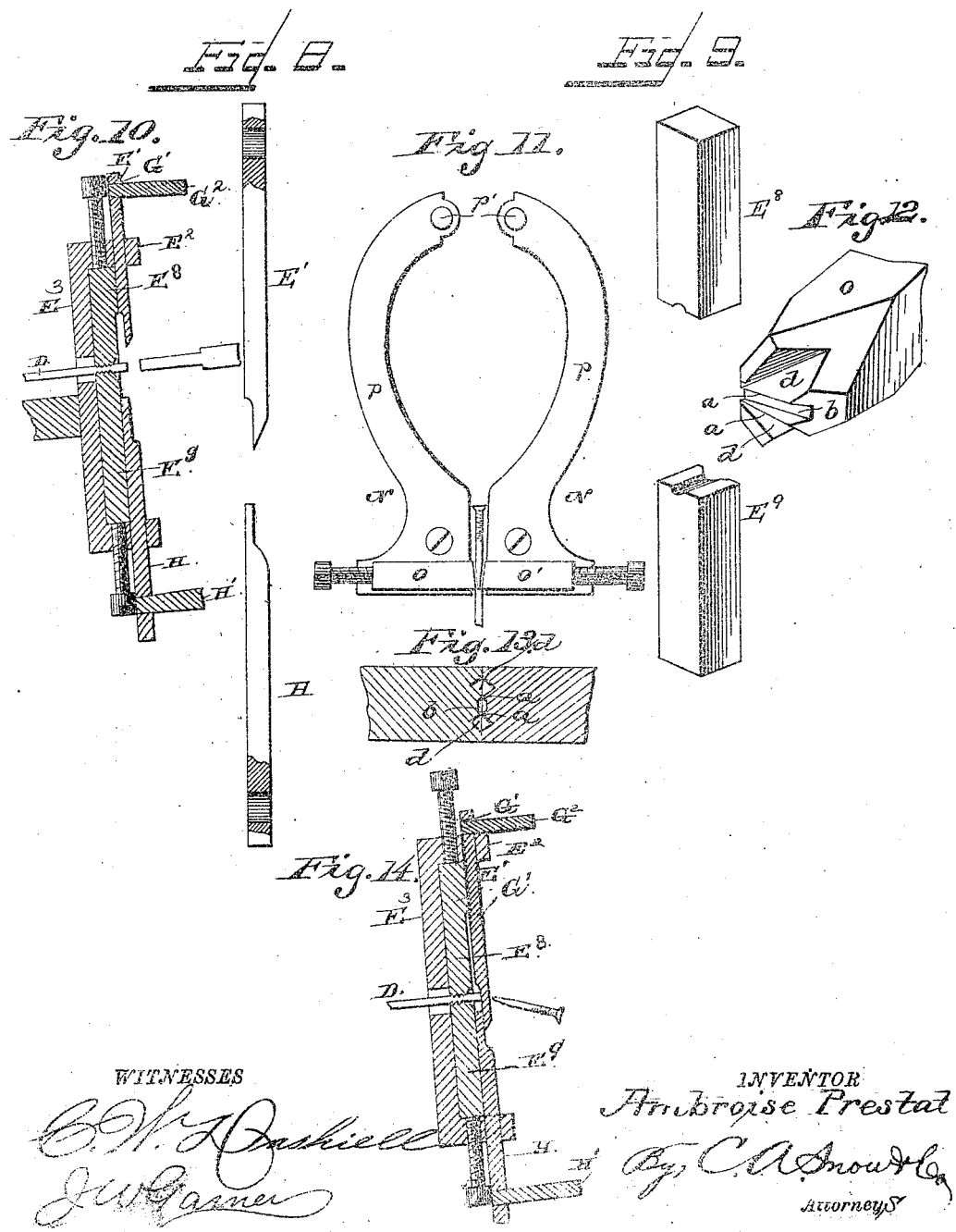

UNITED STATES PATENT OFFICE.

AMBROISE PRESTAT, OF SOUTH ABINGTON STATION, MASSACHUSETTS.

MACHINE FOR MAKING SHOE-NAILS.

SPECIFICATION forming part of Letters Patent No. 326,240, dated September 15, 1885.

Application filed November 18, 1884. (No model.)

*To all whom it may concern:*

Be it known that I, AMBROISE PRESTAT, a citizen of the United States, residing at South Abington Station, in the county of Plymouth and State of Massachusetts, have invented a new and useful Improvement in Machines for Making Shoe-Nails, of which the following is a specification, reference being had to the accompanying drawings.

This invention relates to machines for making shoe-nails from a continuous wire blank; and the special object of the invention is to provide a machine which will make a flat-pointed nail—that is, one having its sides flattened or compressed to form a flat point which will allow clinching of the nail in the manner well known.

It is common to construct a machine which will make shoe-nails from a continuous wire blank. This idea is too old to be claimed by any one at this late date. Recent inventions in this class have been confined more to individual improvements, many of which are based on the round or square pointed nail. The latter form of point to a shoe-nail precludes the possibility of clinching, which is necessary in order that the nail may retain its hold in the shoe. A flat-pointed nail, however, does allow clinching, and this is the main reason why shoe manufacturers always prefer this shape of nail on their best work. It is the object of my invention to construct a machine which will make these flat pointed nails.

The old machine which heretofore made the round-pointed nails cannot be employed to make the flat-pointed nails. Persons of an inquiring turn of mind might reasonably ask why? To make the matter clear I will explain. The old machine from which the round-pointed nails were made usually employed a pair of levers or tongs carrying dies shaped to form either a square or round point. After the wire blank had been headed and threaded it was fed between the dies on the tongs or levers, these dies catching the extreme end of the nail and compressing the latter to form the point, the surplus metal cut from the blank escaping from the dies after their action on the single nail had ceased. At the same time as the round point is formed on the nail the latter is severed or broken from the blank. The severing of the completed nail from the blank can readily be done when a round point is made, inasmuch as the extremity of the point on the nail where it joins with the wire blank is so infinitesimally small as to leave nothing by which the nail could hold or cling to the blank. Consequently, when a round or square point is formed on the nail it necessarily follows that the dies which make the point also sever the nail from the blank; but this is not so when a flat point is formed, for the nail still holds to the wire blank at the point after the dies have completed their action. I have therefore found it necessary to employ additional means to effect this end when a flat-pointed nail has been desired to be made. In the present case a pair of cutters are employed to sever the completed nail from the blank after the dies have flattened and shaped the point.

My invention, therefore, broadly consists in the combination, with the dies for flattening the sides of the nail, of a separate and independent cutter or cutters for severing the completed nail from the blank.

It further consists in the peculiar construction, combination, and arrangement of devices, all as hereinafter set forth, and particularly pointed out in the claims.

In the accompanying drawings, Figure 1 is a plan view of a shoe nail-making machine embodying my improvements. Fig. 2 is an elevation of one side of the machine. Fig. 3 is an elevation of the opposite side. Fig. 4 is a vertical longitudinal section taken on the line *x x*, Fig. 1. Fig. 5 is a vertical longitudinal section taken on the line *y y*, Fig. 1. Fig. 6 is a transverse section taken on the line *z z*, Fig. 1. Fig. 7 is a perspective view of one of the shoe nails made by the machine. Fig. 8 is a detail view of the upper and lower cutters. Fig. 9 is a similar view of the threading-dies. Fig. 10 is a vertical sectional detached view showing the threaded blank held between the threading-dies during the operation of the head-forming hammer. Fig. 11 is a horizontal detached sectional view showing the blank held between the pressing-dies which form the flat sides or point. Fig. 12 is a perspective view of one of the pressing or pointing dies. Fig. 13 is a transverse section on the line a a, Fig. 11. Fig. 14 is a detached vertical sectional view illustrating the action of the cutters.

Like letters are used to indicate corresponding parts in the several figures.

Referring to the accompanying drawings, A represents the base or pedestal for the machine, which base is made hollow to form a receptacle for the finished nails as they drop through the opening in the top of the base after they are cut off. The top of the base or pedestal is inclined, and is arranged to support the bed-plate A' of the machine, which bed-plate has an opening registering with the opening in the top of the base A.

B designates the main or driving shaft, which extends transversely across the machine and is supported in suitable bearings. This shaft is provided at one end, outside of the bearing, with the fixed band-pulleys B' B² and the fly-wheel B³, and at the other end with a cam, B⁸, and a wrist or crank pin, B⁴, the latter being connected by a pitman, B⁵, to the arm B⁶ of the feed-slide C, as seen in Fig. 1.

The feed-slide C is provided with a bearing, C², adjacent to the arm B⁶, and through this bearing passes a rod, C', a set-screw, B⁷, being employed to secure the rod in the bearing. Guide-bearings C³ C³ are employed in which the rod C' slides when the machine is in operation.

The continuous wire blank D from which the nails are formed is fed to the machine in the usual manner. It passes through a hole in the guide-post D', thence between a set of grooved feed and guide rolls, D² D², thence under the feeding blade D³, which is adjustably secured by a set-screw, D⁶, in the arm D⁴, so that as the blade wears away it may be fed downward. The arm D⁴ is pivoted in bearings D⁵, rising from the feed-slide C, a spring bearing against the under side of the arm to retain the blade to its work and yet allow said blade to yield upward in feeding the blank forward. It will readily be understood that the reciprocating movement of the slide C through the connections B⁶ B⁵ B⁴ from the main shaft B is communicated to the blade D³, the latter also having a reciprocating forward and backward movement. As the slide moves backward, the blade is caused to slip over the wire blank; but when the slide is carried forward the blade impinges or bites against the wire to feed it a sufficient length forward to allow for the next nail. From the feeding-blade D³ the wire blank D passes on through a guide-tube, E, and between a pair of dies, E⁸ E⁹, (see Figs. 5 and 9,) the meeting ends of which are formed with a threaded recess into which the wire blank is fed. The upper die, E⁹, moves with the transverse arm E³, which is connected at one end to the long pivoted lever E⁴, Fig. 1, and at the outer end is pivoted in bearings E⁶, provided on the bed-plate of the machine. A spring, E⁵, at the forward end of the machine bears against the under side of the free end of the pivoted lever E⁴ and presses said lever up against the under side of a cam, E⁷, located on the driving-shaft B. By this construction it will be seen that the arm E³ will move vertically a slight distance when the machine is operated, carrying the die E⁹ along with it and away from the lower die, E⁸. The said lower die is stationary, and both dies are held adjustably in place by means of threaded rods. When the arm E³ rises, the dies are separated and the wire is fed forward between the dies a sufficient distance to allow for the next nail. When the arm E³ descends, the wire is pressed between the dies and the threads formed on that portion of the wire that will constitute the shank of the nail which is being made.

In the arm E³, immediately in rear of the die E⁹, is mounted a cutter, E', Fig. 10, which works vertically in guides E², provided on the forward face of the pivoted arm E³. The cutter E' is provided with a head having an eye or perforation, G', at its upper end, in which perforation is inserted one end of the arm G², the other end of which is secured by a set-screw, G⁴, in the rock-shaft G³, Fig. 5, the latter acting to project and operate the upper cutter, E'. The lower cutter, H, which assists in cutting the nail from the wire blank, is secured to an arm, H', provided on a rock-shaft, H², located in bearings H³ beneath the bed-plate A'.

Upon one end of the rock-shaft H², I provide a lever, H⁴, which is rigidly secured thereto by a screw. (See Fig. 2.) The arms H⁵ H⁶ of this lever H⁴ project in opposite directions, a spring, I, secured to a block, I', bearing against the arm H⁵, the other arm, H⁶, engaging the lower arm, H⁷, of an angular lever, I², fulcrumed to the side of the frame at its ends, below and a short distance from the main or driving-shaft B. The upper arm, I³, of the lever I² engages the cam B⁸ on the driving-shaft, so that when the machine is operated motion is communicated to the rock-shaft H² and the lower cutter, H', at the same time that the upper cutter, E', is operated by the mechanism which I will now proceed to describe.

From the rock-shaft G³ an arm or lever, J, extends rearwardly and is curved upwardly over a cam, J', on the driving-shaft B, near the cam B⁸, a coil-spring, J², connecting the lever J with the bed-plate of the machine and holding the lever into engagement with the cam J'. It will thus be seen that the cam J' operates the upper cutter, E', through the lever J and rock-shaft G³ simultaneously with the lower cutter, H.

K designates the hammer, which consists of a sliding-bar grooved in its vertical sides and working in ways by the action of a spring-lever, K', preferably V-shaped in form, the lower end of the lever being secured in a seat, K², projecting from the pedestal at the lower rear end thereof. A guard, L, extends from the rear end of the base-plate and confines the spring-lever to its limits. A triple cam, M, on the driving-shaft B engages a shoulder or projection, M', on the hammer K when the shaft B is revolved, and thereby forces the hammer back so as to compress the arms of the spring-lever K'. As the shoulder M' on the hammer becomes disengaged from the triple-cam M, the hammer is thrown forward by the spring-lever K' and strikes the projecting end of the wire blank. During the action of the hammer the wire blank is held between the dies E⁸ E⁹, the meeting ends of which are formed countersunk in the manner well known. (See Fig. 10.) Thus as the hammer strikes the projecting portion of the wire blank, it forces this portion into the countersunk portion of the dies, thereby forming the head for the completed nail. As soon as the head is formed on the advance end of the blank and the threads are formed on the sides thereof, the wire D is then fed forward between compressing or flattening dies O O', one of which is shown in Fig. 12. These dies are located transversely in the front ends of the tongs or levers N, which consist of two pivoted arms, P, fulcrumed below the rock-shaft G³, and provided on their upper faces at their rear ends with studs P' P', the latter being operated by the triple cam M on the driving-shaft B. The tongs or levers N N work in a horizontal plane, so that the dies O O' close upon the wire on each side with such force as to compress or flatten the metal. The outer ends of the dies O O' project from the tongs or levers N N a sufficient distance to catch the wire blank.

The meeting outer ends or operating-faces of the dies are formed with horizontal transverse cutting-edges a, which are arranged parallel to each other and are separated by a recess or depression, b, in which the sides of the wire blanks are received. As the tongs or levers N N alternately approach and recede from each other, by the action of the mechanism before described, it will be observed that the cutting-edges a of each die carried by the tongs will co-operate in acting upon the opposite sides of the wire blank. Since the cutting-edges a are arranged horizontally and parallel to each other, the recess or depression b between the said cutting-edges will be oblong or rectangular in form. Thus as the wire blank is received in the recess or depression, the shape thereof, when the two dies come together, will form the flat point to the nail. It is preferred that the recess or depression b be made deeper at the inner end, so that the point where the flattening of the sides commences will be gradually rounded, and the shape of the nail-shank thereby preserved.

The operating faces of the dies O O are also provided with oblique depressions or recesses d d above and below the cutting-edges a, which recesses d d diverge from the latter both upwardly and downwardly as they recede from the cutting-edges. It will be seen that when the dies O O' close upon the wire blank, the latter, being received in the recess b, will be flattened, this action causing the metal displaced from the sides to spread upward and downward. This surplus metal pressed from the wire blank by the flattening of the sides is cut by the horizontal parallel cutting-edges a a, leaving the main portion of the wire blank within the recess or depression b. The pieces or chips cut from the wire blank by the edge a work out through the oblique recesses d, leaving the flat point of the nail proper within the horizontal recess b of the dies. It is well known that when metal is flattened it spreads. For this reason I provide the cutting-edges a and oblique recesses d to cut the portions of the nail-blank which spread upward and downward by the action of the dies, and convey these chips away through the recesses d, so as not to clog or impede the further operation of the machine. The nail is then left in a condition to cut from the blank, as will be presently described; the diameter of the flat point of the nail being equal to the diameter of the shank or body. It will therefore be understood that it is essential that the dies be constructed to cut the spreading portions of the wire blank and leave the flat nail-point perfect in every respect.

As soon as the flat point is formed by the dies O O', the tongs move outward, causing the dies to recede from the nail on the wire blank, the latter standing motionless. The cutters E' and H are then worked simultaneously by means of the intermediate gearing actuated, respectively, by the cams J' B⁵ on the main driving-shaft, and these cutters sever the completed nail at the point from the wire blank, the nail dropping into the receptacle below. As the cutters work in rear of the dies, a portion of the wire blank will project from the exit end of the latter after the cutters have completed their work, this projecting portion of the wire blank allowing for the head to be formed when the hammer is operated. The operation may then be repeated as often as desired.

The essential feature of the present invention resides in the pivoted tongs or levers carrying the dies to flatten or compress the sides of the nail-blank, and the cutters operating simultaneously to sever the nail from the wire blank as soon as the dies separate from the completed nail. By this arrangement I am enabled to manufacture a flat-pointed nail, as hereinbefore stated.

Having described my invention I claim—

1. The driving-shaft, in combination with the tongs or levers operated by the latter, and dies carried by the tongs to close around the wire on opposite sides with such force as to compress the metal and form the flattened point, as set forth.

2. In a machine for making nails from a continuous wire, the dies O O', having on their contiguous faces flat portions to compress the end of the blank on opposite sides, and parallel horizontal cutting-edges a for shearing away from the sides of the blank the surplus metal projected laterally by the act of compression, as set forth.

3. In a machine for making nails from a continuous wire blank, the dies O O', which co-operate to form the point of the nail and shear off the sides thereof, in combination with the independent cutting mechanism, arranged to sever the completed nail from the blank, as set forth.

4. The tongs or levers carrying the dies O O', which co-operate to form the point of the nail, in combination with the independent cutting mechanism arranged to sever the nail from the blank as soon as the dies recede or separate from the nail, as set forth.

5. The dies O O', which co-operate to form the point of the nail, in combination with the upper and lower cutters working simultaneously to cut the nail from the blank as soon as the dies have completed their action, as set forth.

6. The driving-shaft provided with the cams J' and B², and the cam M, in combination with the upper and lower cutters, the feed-slide, and the hammer, as set forth.

7. The driving-shaft, in combination with the upper and lower rock-shafts, the cutters connected to the rock-shafts, and connecting devices between the latter and the driving-shaft to cause the simultaneous movement of the cutters, as set forth.

8. The lower cutter, H, and the rock-shaft connected thereto, in combination with the spring-actuated lever H⁴, the angular lever I², and the cam B⁸ on the driving-shaft, as set forth.

9. The upper cutter, E', and the rock-shaft G², connected thereto, in combination with the lever J and the cam on the driving-shaft for working the lever, as set forth.

10. The upper cutter, E', in combination with the rock-shaft G³, connected thereto and operated by the driving-shaft of the machine, as set forth.

11. The lower cutter, H, in combination with the rock-shaft H³, connected thereto and operated by the driving-shaft of the machine, as set forth.

12. The vertically-movable arm E², carrying the upper die, in combination with the lower die, devices for feeding the wire forward between the dies, the upper cutter working vertically in but independent of the arm E² in rear of the dies, and the lower cutter, as set forth.

13. The mechanism for feeding the wire, the hammer for forming the head, and the threading dies, in combination with the pointed dies carried by the tongs or levers to form the flat point on the nail, and the cutters operating between the tongs and the threaded dies to sever the nail at the point from the wire blank, as set forth.

14. The mechanism for feeding the wire, forming the head on the advance end thereof, and threading the shank, in combination with the devices for compressing or flattening the opposite sides of the blank and shearing away from the sides of the blank the surplus metal projected laterally by the act of compression, and independent cutting mechanism for cutting or severing the nail at the end of the point from the wire blank, as set forth.

In testimony that I claim the foregoing as my own I have hereto affixed my signature in presence of two witnesses.

AMBROISE PRESTAT.

Witnesses:
HERBERT C. HOPKINS,
ACHILLE E. PRESTAT.